United States Patent
Sagawa et al.

(10) Patent No.: US 9,670,093 B2
(45) Date of Patent: Jun. 6, 2017

(54) HYDRAULIC COMPOSITION

(71) Applicant: KAO CORPORATION, Tokyo (JP)

(72) Inventors: Keiichiro Sagawa, Wakayama (JP);
Keisuke Nakamura, Wakayama (JP);
Masaaki Shimoda, Wakayama (JP);
Koji Nagasawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/107,026

(22) PCT Filed: Aug. 27, 2015

(86) PCT No.: PCT/JP2015/074174
§ 371 (c)(1),
(2) Date: Jun. 21, 2016

(87) PCT Pub. No.: WO2016/035661
PCT Pub. Date: Mar. 10, 2016

(65) Prior Publication Data
US 2016/0318801 A1 Nov. 3, 2016

(30) Foreign Application Priority Data

Sep. 5, 2014 (JP) .................... 2014-180971

(51) Int. Cl.
C04B 24/16 (2006.01)
C04B 24/00 (2006.01)
C04B 24/12 (2006.01)
C04B 28/08 (2006.01)
C04B 7/153 (2006.01)
C04B 28/14 (2006.01)

(52) U.S. Cl.
CPC .............. *C04B 24/16* (2013.01); *C04B 7/153* (2013.01); *C04B 24/00* (2013.01); *C04B 24/12* (2013.01); *C04B 24/121* (2013.01); *C04B 28/08* (2013.01); *C04B 28/141* (2013.01); *Y02P 40/143* (2015.11)

(58) Field of Classification Search
CPC C04B 7/53; C04B 24/00; C04B 24/12; C04B 24/121; C04B 24/16; C04B 28/08; C04B 28/141
See application file for complete search history.

(56) References Cited

U.S. PATENT DOCUMENTS

| | | |
|---|---|---|
| 2013/0059099 A1 | 3/2013 | Song et al. |
| 2013/0112113 A1 | 5/2013 | Sagawa et al. |
| 2015/0080500 A1 | 3/2015 | Dierschke et al. |

FOREIGN PATENT DOCUMENTS

| | | |
|---|---|---|
| CN | 103787600 A | 5/2014 |
| EP | 2 980 038 A1 * | 2/2016 |
| JP | 61-77655 A | 4/1986 |
| JP | 61-117142 A | 6/1986 |
| JP | 2006-298661 A | 11/2006 |
| JP | 2012-36077 A | 2/2012 |
| JP | 2013-517202 A | 5/2013 |
| WO | WO 2013/152963 A1 | 10/2013 |
| WO | WO 2014/156858 A1 * | 10/2014 |

OTHER PUBLICATIONS

International Search Report issued in PCT/JP2015/074174, dated Nov. 2, 2015.
Machine translation of JP-61-117142-A dated Jun. 4, 1986.

* cited by examiner

*Primary Examiner* — Anthony J Green
(74) *Attorney, Agent, or Firm* — Birch, Stewart, Kolasch & Birch, LLP

(57) ABSTRACT

The present invention is a hydraulic composition, which includes an α-hydroxy sulfonic acid or a salt thereof, a hydraulic powder and water, wherein the ratio of slag in the hydraulic powder is 60% by mass or more.

9 Claims, No Drawings

HYDRAULIC COMPOSITION

FIELD OF THE INVENTION

The present invention relates to a hydraulic composition.

BACKGROUND OF THE INVENTION

Hydraulic compositions used in the fields of civil engineering, architecture, and the like contain hydraulic powder and water. As hydraulic powder, exemplified are portland cement (JIS R 5210), blast furnace cement (JIS R 5211), silica cement (JIS R 5212), fly ash cement (JIS R 5213), alumina cement and others. As quality standards for cement, the strength classes are classified in terms of the strength (for example, three ranks for 28-day strength and two ranks for early strength) as in Europe or China. However, in any case, cement is contained as a main component of hydraulic powder. One of the reasons therefor is to ensure the strength required for removal from a formwork after hardening, especially 3-day strength expressed as the early strength.

JP-A 61-117142 discloses, as a cement composition with a hardening acceleration property, a cement composition containing sodium hydroxymethanesulfonate and sodium thiocyanate.

In the meantime, in the steel industry, a substance, which contains a mineral component separated by melting from metals for metallurgy, is generated as a by-product during iron smelting from an ore. This substance is called slag. Conventionally, slag has been actively used as a part of raw materials or products mainly in the field of building materials. In particular, in the field of cement, it is used not only as a raw material but also as a product or an admixture blended in cement.

However, although slag is a mineral having a latent hydraulic property, it hardly exhibits an early strength of the level of three days. Therefore, in order to exhibit a high early strength, a formulation amount of cement, an improvement of degree of fineness or the like is adjusted.

JP-A 2013-517202 discloses, as an alkali activation binder not containing cement, mortar or concrete containing a composite activator composed of slag, an alkaline hydroxide and a carbonate.

SUMMARY OF THE INVENTION

The present invention relates to a hydraulic composition, which contains an α-hydroxy sulfonic acid or a salt thereof, hydraulic powder and water, wherein the ratio of slag in the hydraulic powder is 60% by mass or more.

SUMMARY OF THE INVENTION

At present, for using a hydraulic composition as a material for structures, it is necessary to use a hydraulic compound such as cement to some extent. If the early strength of a hardened product of the hydraulic composition can be enhanced by formulation where a mixing amount of slag is increased within the range of quality standards, this will result in a reduced amount of cement. Then, a reduction in the amount of cement is important from the viewpoint of reducing an emission of greenhouse gas generated at the time of cement production.

In JP-A 2013-517202, an alkaline hydroxide being an inorganic compound and a carbonate are used as alkali activator. However, further improvements are desired in terms of the handleability in that the alkali activator is powder or used as a binder by being mixed with a raw material such as slag; and in terms of the improvement in the early strength.

The present invention provides a hydraulic composition, which uses slag as a main component of hydraulic powder and has a high early strength.

According to the present invention, there is provided a hydraulic composition with a high early strength, wherein slag is used as a main component of hydraulic powder.

The hydraulic composition of the present invention contains slag and an α-hydroxy sulfonic acid or a salt thereof, preferably further contains alkanolamine, and in addition, preferably further contains an aromatic compound having a hydroxyl group. Such formulation produces an effect of enhancing a compressive strength at the time of hardening a hydraulic composition, especially the early strength. The reason that such effect can be produced is not clear, but it is believed as described below.

It is speculated that sulfate ions are released as an α-hydroxy sulfonic acid or a salt thereof is decomposed in a hydraulic composition containing water and slag and further oxidized. Further, it is estimated that reaction with calcium and aluminum present in the composition produces a hydrate such as ettringite with a large molar volume and voids are filled efficiently, thereby enhancing the strength.

Further, an α-hydroxy sulfonic acid or a salt thereof is used as an additive at the time of preparing a hydraulic composition containing hydraulic powder; or used, in producing hydraulic powder, at the time of grinding a compound mainly composed of slag. It is speculated that this exhibits an effect of enhancing a hydration ratio relative to a hydraulic powder mainly composed of slag, eventually an effect of improving the early strength of a hardened product.

Further, when alkanolamine and an aromatic compound having a hydroxyl group are contained, it is considered that an increase of hydration speed occurs to further improve the strength, in addition to the effect of enhancing a hydration ratio by control of a hydration product.

An α-hydroxy sulfonic acid is a compound that is also referred to as α-hydroxy alkane sulfonic acid, and represented by

[Chemical formula 1]

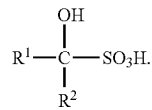

Herein, $R^1$ and $R^2$ are each independently a proton or a hydrocarbon radical that may have a hydroxy group, such as an alkyl group with 1 or more and 10 or less carbon atoms that may have a hydroxy group.

Examples of α-hydroxy sulfonic acid include those having one or more carbon atoms, preferably 10 or less, more preferably 6 or less, and further preferably 4 or less. Specific examples include hydroxymethanesulfonate, 1,2-dihyroxypropane-2-sulfonic acid.

Exemplary salts of α-hydroxy sulfonic acid include alkali metal salts such as sodium salts and potassium salts. From the viewpoint of shortening a period for the hydraulic composition to reach a necessary strength, α-hydroxy sulfonates are preferred. More preferred are alkali metal salts of α-hydroxy sulfonic acid and further preferred are sodium salts of α-hydroxy sulfonic acid.

The α-hydroxy sulfonic acid or a salt thereof is preferably one or more kinds of compounds selected from hydroxymethanesulfonate, 1,2-dihyroxypropane-2-sulfonic acid, and salts thereof.

As the α-hydroxy sulfonic acid or a salt thereof, commercial products may be used.

The hydraulic composition of the present invention contains an α-hydroxy sulfonic acid or a salt thereof in an amount of, from the viewpoint of the early strength of the hydraulic compound, preferably 0.0005 parts by mass or more, more preferably 0.005 parts by mass or more, further preferably 0.015 parts by mass or more, further more preferably 0.030 parts by mass or more, and further more preferably 0.050 parts by mass or more, relative to 100 parts by mass of the hydraulic powder; and from the viewpoint of the early strength of the hydraulic compound and the cost for an additive, preferably 1.000 part by mass or less, more preferably 0.500 parts by mass or less, further preferably 0.25 parts by mass or less, and further more preferably 0.15 parts by mass or less.

The hydraulic composition of the present invention contains hydraulic powder, and the ratio of slag in the hydraulic powder is 60% by mass or more.

In the present invention, the hydraulic powder signifies both a substance having a property of hardening by reaction with water; and a substance that does not exhibit the hardenability by itself but, when combined with an alkali substance such as lime or cement, exhibits a property of hardening by forming a hydrate through an interaction via water.

Slag is a substance containing a mineral component, which is separated from metals for metallurgy by smelting during metal refining from ores.

Slag does not exhibit the hardenability by itself, but when combined with an alkali substance such as lime or cement, exhibits a property of hardening (latent hydraulic property) by forming a hydrate through an interaction via water. Slag with a high latent hydraulic property desirably has a high vitrification ratio and a high basicity. Slag coagulates more slowly than ordinary portland cement and has a reduced strength at early age, but its strength at long-term age is equal to or more than that of ordinary portland cement. In addition, a hardened composition has a dense structure, so the chemical resistance is enhanced. Further, heat of hydration to be generated is largely reduced in comparison with concrete using ordinary portland cement, and thus, a dense structure with less cracking. In addition to these advantages produced by using slag, the present invention enhances the early strength of a hardened product.

Examples of slag include, from the viewpoint of the quality stability of slag, iron and steel slag produced as a by-product during iron and steel production process, preferably blast furnace slag, and further preferably granulated blast furnace.

In the present invention, from the viewpoint of the strength enhancement rate of the 3-day strength from a state with no addition thereto, the ratio of slag in the hydraulic powder is preferably 80% by mass or more, more preferably 84% by mass or more, and further preferably 88% by mass or more; and preferably 99% by mass or less, more preferably 95% by mass or less and further preferably 92% by mass or less.

Hydraulic powder other than slag is preferably a powder selected from substances having a property of hardening by reaction with water and substances other than slag having a latent hydraulic property. Specific examples thereof include cement, gypsum, alkali earth metal hydroxides, fly ash and silica fume.

In the present invention, from the viewpoint of reducing an emission of greenhouse gas generated at the time of cement production, the ratio of cement in the hydraulic powder is preferably 35% by mass or less, more preferably 25% by mass or less, further preferably 10% by mass or less, further more preferably 7% by mass or less, and further more preferably 5% by mass or less; and preferably 0% by mass or more. It is further more preferable that the ratio of cement is substantially 0% by mass, or 0% by mass. Substantially 0% by mass signifies that the ratio of cement does not reach to an amount that enables it to work as a hydraulic powder.

When hydraulic powder is referred to in the present invention, it indicates slag, cement, gypsum and calcium hydroxide.

Examples of the hydraulic powder of the present invention include a slag composition containing slag, and further a slag composition containing slag and optionally other powder. The hydraulic powder is preferably a slag composition containing slag, gypsum and calcium hydroxide.

The slag composition contains slag in an amount of 60% by mass or more and preferably 70% by mass or more; and preferably 95% by mass or less and more preferably 93% by mass or less.

Further, the slag composition contains gypsum, in terms of gypsum dihydrate, in an amount of preferably 3% by mass or more, more preferably 5% by mass or more, and further preferably 8% by mass or more; and preferably 40% by mass or less, more preferably 20% by mass or less, and further preferably 13% by mass.

Further, the slag composition contains calcium hydroxide in an amount of preferably 0% by mass or more, more preferably 0.1% by mass or more, and further preferably 0.3% by mass or more; and preferably 5% by mass or less, more preferably 2% by mass or less and further preferably 1% by mass or less.

Further, the content of the slag composition in the hydraulic powder is preferably 65% by mass or more, more preferably 75% by mass or more, further preferably 90% by mass or more, further more preferably 93% by mass or more, further more preferably 95% by mass or more, and further more preferably substantially 100% by mass or 100% by mass. Substantially 100% by mass signifies that no addition of powder other than the slag composition is intentionally made and a tiny amount of other powder that is unavoidably incorporated during production process may be contained.

For obtaining a blast furnace slag powder as a hydraulic powder, for example, sand-like slag is provided by performing rapid cooling treatment, such as injection of pressurized water, on a substance (slag precursor substance) containing a mineral component, which is separated from metals for metallurgy by smelting during metal refining from ores, and the obtained sand-like slag is ground, and thereby, a blast furnace slag powder having a predetermined specific surface area, for example, a blaine value of 3000 $cm^2/g$ or more, is produced. The thus-obtained blast furnace slag powder is mixed with gypsum and calcium hydroxide, and hydraulic powder can be prepared. Further, gypsum and calcium hydroxide may be added at the time of grinding sand-like slag. The hydraulic powder may contain cement, but the present invention can reduce an amount of cement to be used.

The hydraulic powder according to the present invention can be obtained by adjusting grinding conditions depending on the raw material, usage (usage dictated by strength class of cement) or the like so that powder having an appropriate particle size can be obtained. When it is a substance having a property of hardening by reaction with water, the specific surface area (blaine value) is, from the viewpoint of the hydration reaction, preferably 2000 cm$^2$/g or more, more preferably 2500 cm$^2$/g or more, further preferably 3000 cm$^2$/g or more; and from the viewpoint of reducing energy associated with grinding and the viewpoint of preventing cracking associated with heat of hydration, preferably 10000 cm$^2$/g or less, more preferably 7000 cm$^2$/g or less, and further preferably 5000 cm$^2$/g or less. Further, the specific surface area of slag is preferably 2000 cm$^2$/g or more, more preferably 2500 cm$^2$/g or more, and further preferably 3000 cm$^2$/g or more; and preferably 10000 cm$^2$/g or less, more preferably 7000 cm$^2$/g or less, and further preferably 5000 cm$^2$/g or less. Adjustment of, for example, a grinding period can provide a specific surface area of interest. A longer grinding period tends to provide a larger specific surface area, and a shorter one tends to provide a smaller specific surface area.

A grinding device to be used for grinding sand-like slag is not particularly limited, but examples thereof include a ball mill generally used to grind cement or the like, and a vertical mill. A material of a grinding medium (for example, grinding ball, roller) of the device is desirably one having a hardness equal to or greater than that of a substance to be ground (for example, blast furnace slag), and examples of generally and commercially available products thereof include steel, stainless, alumina, zirconia, titania and tungsten carbide.

The hydraulic composition of the present invention may contain alkanolamine. When an addition amount of alkanolamine is adjusted depending on the composition of the hydraulic powder, the early strength can be enhanced. It is speculated that addition of alkanolamine causes an appropriate chelate effect thereby to further promote the generation of ettringite from components contained in a slag composition.

Examples of alkanolamine include monoalkanolamines, dialkanolamines, and trialkanolamines. Examples of alkanolamine include monoalkanolamines having one alkanol group with 1 or more and 5 or less carbon atoms; dialkanolamines having two alkanol groups with 1 or more and 5 or less carbon atoms; and trialkanolamines having three alkanol groups with 1 or more and 5 or less carbon atoms. Alkanolamine is preferably a trialkanolamine, more preferably a trialkanolamine having three alkanol groups with 1 or more and 4 or less carbon atoms, and further preferably a trialkanolamine having three alkanol groups with 2 or 3 carbon atoms. Specific examples include triethanolamine and triisopropanolamine. As alkanolamine, a commercial product can be used.

The hydraulic composition of the present invention contains alkanolamine, from the viewpoint of the early strength of a hydraulic compound, preferably 0.0005 parts by mass or more, more preferably 0.005 parts by mass or more, further preferably 0.010 parts by mass or more, further more preferably 0.050 parts by mass or more and further more preferably 0.070 parts by mass or more, relative to 100 parts by mass of the hydraulic powder; and, from the viewpoint of the early strength of a hydraulic compound and the cost for addition, preferably 1.000 part by mass or less, more preferably 0.500 parts by mass or less, further preferably 0.250 parts by mass or less, further more preferably 0.150 parts by mass or less, and further more preferably 0.120 parts by mass or less.

When the hydraulic composition of the present invention contains alkanolamine, the mass ratio between α-hydroxy sulfonic acid or a salt thereof; and alkanolamine (α-hydroxy sulfonic acid or a salt thereof/alkanolamine) is, from the viewpoint of the early strength of a hydraulic compound, preferably 25/75 or more and more preferably 30/70 or more; and preferably 75/25 or less and more preferably 60/40 or less.

The hydraulic composition of the present invention may contain an aromatic compound having a hydroxyl group. The aromatic compound having the hydroxyl group is preferred as a component that can enhance the early strength. It is speculated that the aromatic compound having the hydroxyl group promotes early hydration of components contained in a slag composition, increases a hydration reaction rate, and enhances the strength earlier. That is, a dense silicate hydrate layer (gel layer) formed immediately after hydration from a slag composition usually becomes an inhibitor for early hydration, but it is speculated that the chelate effect of the aromatic compound having the hydroxyl group promotes dissolution of the gel layer in water, thereby to remove inhibition to hydration reaction and to enhance the strength earlier.

As an aromatic compound having a hydroxyl group, preferred is an aromatic compound having a hydroxyl group and a total carbon number of from 6 to 12. Further, the number of hydroxyl groups is preferably from 1 to 5. That is, as the aromatic compound having the hydroxyl group, preferred is an aromatic compound having from 1 to 5 hydroxyl groups and a total carbon number of from 6 to 12. Examples of the aromatic compound having the hydroxyl group include cyanocatechols and nitrocatechols, preferably 4-cyanocatechol and 4-nitrocatechol. As the aromatic compound having the hydroxyl group, a commercial product can be used.

The hydraulic composition of the present invention contains an aromatic compound having a hydroxyl group, from the viewpoint of enhancing the early strength of the hydraulic composition, in an amount of: preferably 0.0005 parts by mass or more, more preferably 0.001 parts by mass or more, further preferably 0.003 parts by mass or more, further more preferably 0.005 parts by mass or more and further more preferably 0.010 parts by mass or more relative to 100 parts by mass of the hydraulic powder; and from the viewpoint of curbing the cost for addition, preferably 1.000 part by mass or less, more preferably 0.500 parts by mass or less, further preferably 0.25 parts by mass or less and further more preferably 0.20 parts by mass or less.

When the hydraulic composition of the present invention contains alkanolamine, it also preferably contains an aromatic compound having a hydroxyl group.

In order to obtain a hydraulic composition with the presence of an α-hydroxymethanesulfonate or a salt thereof, alkanolamine and an aromatic compound having a hydroxyl group, it is preferred that, for example, an α-hydroxymethanesulfonate or a salt thereof, alkanolamine and an aromatic compound having a hydroxyl group are added to slag-containing hydraulic powder and kneaded with water. Examples of the method for addition include a method wherein a liquid, preferably an aqueous solution containing each of an α-hydroxymethanesulfonate or a salt thereof, alkanolamine and an aromatic compound having a hydroxyl group is fed to slag-containing hydraulic powder. An α-hydroxymethanesulfonate or a salt thereof, alkanolamine and an aromatic compound having a hydroxyl group each in the form of a liquid, preferably an aqueous solution may be added separately to slag-containing hydraulic powder, or may be added to slag-containing hydraulic powder after they are mixed. Regarding addition of these components, the entire amount to be eventually used may be added in block or may be added in installments. Further, the addition may be carried out continuously or intermittently. Furthermore, the addition may be carried out at the time of grinding a raw material of hydraulic powder.

From the viewpoint of suppressing a strength reduction caused by an increased amount of air in the hydraulic composition, the hydraulic composition of the present invention may further contain an antifoaming agent. Further, the presence of an antifoaming agent during the production of hydraulic powder distributes the antifoaming agent uniformly over the surface of obtained hydraulic powder, so that the suppression effect can be more effectively produced. That is, in the presence of an α-hydroxymethanesulfonate or a salt thereof and an antifoaming agent or in the presence of an α-hydroxymethanesulfonate or a salt thereof, alkanolamine, an aromatic compound having a hydroxyl group and an antifoaming agent, a reduction in the compressive strength of a hydraulic composition caused by an increase of air amount in the hydraulic composition can be suppressed.

As the antifoaming agent, preferred is an antifoaming agent selected from silicone-based antifoaming agents, fatty acid ester-based antifoaming agents and ether-based antifoaming agents. Among silicone-based antifoaming agents, dimethylpolysiloxane is more preferred; among fatty acid ester-based antifoaming agents, polyalkylene glycol fatty acid ester is more preferred; and among ether-based antifoaming agents, polyalkylene glycol ether is more preferred.

The hydraulic composition of the present invention may contain an alkali metal hydroxide. An alkali metal hydroxide is preferred as a component that can enhance the early strength.

As the alkali metal hydroxide, hydroxides having an alkali metal such as lithium, sodium and potassium are preferred from the viewpoint of the availability; and hydroxides having an alkali metal selected from sodium and potassium are more preferred. Examples of the alkali metal hydroxide include lithium hydroxide, sodium hydroxide, potassium hydroxide and the like, and sodium hydroxide is preferred. As the alkali metal hydroxide, a commercial product can be used.

The hydraulic composition of the present invention contains an alkali metal hydroxide, from the viewpoint of accelerating pozzolanic reaction, in an amount of preferably 0.0005 parts by mass or more, more preferably 0.001 parts by mass or more, further preferably 0.005 parts by mass or more, relative to 100 parts by mass of the hydraulic powder; and from the viewpoint of controlling pozzolanic reaction, preferably 1.0 part by mass or less, more preferably 0.50 parts by mass or less, further preferably 0.10 parts by mass or less and further more preferably 0.05 parts by mass or less.

In order to obtain a hydraulic composition with the presence of an α-hydroxymethanesulfonate or a salt thereof, alkanolamine and an aromatic compound having a hydroxyl group, it is preferred that, for example, an α-hydroxymethanesulfonate or a salt thereof, alkanolamine, an aromatic compound having a hydroxyl group and an alkali metal hydroxide are added to slag-containing hydraulic powder and kneaded with water. Examples of the method for addition include a method wherein a liquid, preferably an aqueous solution containing each of them is fed to slag-containing hydraulic powder. An α-hydroxymethanesulfonate or a salt thereof, alkanolamine, an aromatic compound having a hydroxyl group, and an alkali meal hydroxide each in the form of a liquid, preferably an aqueous solution may be added separately to slag-containing hydraulic powder, or may be added to slag-containing hydraulic powder after they are mixed. Regarding addition of these components, the entire amount to be eventually used may be added in block or may be added in installments. Further, the addition may be carried out continuously or intermittently. Furthermore, the addition may be carried out at the time of grinding a raw material of hydraulic powder.

The hydraulic composition of the present invention may contain an aggregate. Examples of the aggregate include fine aggregates and coarse aggregates. Preferred fine aggregates include pit sand, land sand, river sand, and crushed sand; and preferred coarse aggregates include pit gravel, land gravel, river gravel, and crushed gravel. Depending on the intended use, a lightweight aggregate may be used. Terms for aggregates are in accordance with "KONKURITO SORAN (Comprehensive Bibliography of Concrete)"(Jun.10, 1998, issued by Gijyutsu Shoin). Regarding the content of aggregates, they may be used in such a range that is applied for usually-used mortar or concrete.

From the viewpoint of increasing the fluidity, the hydraulic composition of the present invention may contain a dispersant. Examples of the dispersant include phosphate ester polymers, polycarboxylic acid copolymers, sulfonic acid copolymers, naphthalene polymers, melamine polymers, phenol polymers and lignin polymers. The dispersant may be an admixture blended with other components.

The hydraulic composition of the present invention may further contain other components. Examples thereof include AE agents such as resin soaps, saturated and unsaturated fatty acids, lauryl sulfate, alkylbenzenesulfonic acids or salts thereof, alkane sulfonates, polyoxyalkylene alkyl (or alkylphenyl) ethers, polyoxyalkylene alkyl (or alkylphenyl) ether sulfuric acid esters and salts thereof, polyoxyalkylene alkyl (or alkylphenyl) ether phosphoric acid esters or salts thereof, protein materials, alkenyl succinic acids, and α-olefin sulfonates.

In addition, exemplified are: retarders including oxycarboxylic acid retarders such as gluconic acid, glucoheptonic acid, arabonic acid, malic acid and citric acid, sugar retarders such as dextrin, monosaccharides, oligosaccharides and polysaccharides, and sugar alcohol retarders; foaming agents; viscous agents; silica sand; early strengthening agents or accelerators including soluble calcium salts such as calcium chloride, calcium nitrite, calcium nitrate, calcium bromide and calcium iodide, chlorides such as iron chloride and magnesium chloride, carbonates, formic acid or salts thereof; blowing agents; waterproofing agents such as resin acids or salts thereof, fatty acid esters, fats and oils, silicones, paraffins, asphalts and waxes; fluidizing agents; and antifoaming agents such as dimethylpolysiloxanes, polyalkylene glycol fatty acid esters, mineral oils, fats and oils, oxyalkylenes, alcohols and amides.

Further, exemplified are: anticorrosives such as nitrites, phosphates and zinc oxide; water-soluble polymers including celluloses such as methylcellulose and hydroxyethyl cellulose, natural polymers such as β-1,3-glucan and xanthan gum, and synthetic polymers such as polyacrylic acid amides, polyethylene glycols and ethylene oxide adducts of oleyl alcohol or reaction products of these adducts with vinylcyclohexene diepoxide; polymer emulsions such as alkyl (meth)acrylates.

The hydraulic composition obtained according to the present invention has an improved compressive strength at the time of hardening, especially an improved early strength.

The hydraulic composition obtained according to the present invention can be used as a material for concrete structures or concrete products. Concrete using the hydraulic composition obtained according to the present invention has an improved early compressive strength such as 3-day early compressive strength after water contact, and thus, it can provide a demolding period equal to that of concrete using cement. In addition, there are advantages such as an expected improvement of long-term strength in comparison with ordinary Portland cement and an improvement of chemical resistance. Further, it is advantageous that even when hydraulic powder having a low early age strength after water contact (such as fly ash, silica fume and limestone) is formulated or substituted within such a range that does not deteriorate the ratio of slag in the hydraulic powder, there is provided an equal or higher 3-day compressive strength after water contact.

Examples of the hydraulic composition of the present invention include mortar and concrete. Further, the hydraulic composition of the present invention is useful in any field for self-leveling, refractories, plaster, light-weight or heavy-weight concrete, AE, repairing, prepacking, tremies, foundation improvement, grout and cold weather. From the viewpoint of exhibiting the strength after about 24 hours and enabling removal from a formwork at early time, use for concrete products such as concrete vibration products or centrifugally molded products is preferred.

Aspects of the present invention will be described below.

<1>

A hydraulic composition containing an α-hydroxy sulfonic acid or a salt thereof, hydraulic powder and water, wherein the ratio of slag in the hydraulic powder is 60% by mass or more.

<2>

The hydraulic composition described in the above <1>, wherein the hydraulic composition contains the α-hydroxy sulfonic acid or the salt thereof in an amount of preferably 0.0005 parts by mass or more, more preferably 0.005 parts by mass or more, further preferably 0.015 parts by mass or more, further more preferably 0.030 parts by mass or more, and further more preferably 0.050 parts by mass or more, relative to 100 parts by mass of the hydraulic powder; and preferably 1.000 part by mass or less, more preferably 0.500 parts by mass or less, further preferably 0.25 parts by mass or less, and further more preferably 0.15 parts by mass or less.

<3>

The hydraulic composition described in the above <1> or <2>, wherein the ratio of cement in the hydraulic powder is preferably 35% by mass or less, more preferably 25% by mass or less, further preferably 10% by mass or less, further more preferably 7% by mass or less, and further more preferably 5% by mass or less, and preferably 0% by mass or more; or the ratio of cement in the hydraulic powder is substantially 0% by mass or 0% by mass.

<4>

The hydraulic composition described in any one of the above <1> to <3>, wherein the hydraulic powder is a slag composition containing slag, further a slag composition containing slag and optionally other powder, and further a slag composition containing slag, gypsum and calcium hydroxide.

<5>

The hydraulic composition described in the above <4>, wherein the slag composition contains slag in an amount of 60% by mass or more and preferably 70% by mass or more; and preferably 95% by mass or less and more preferably 93% by mass or less.

<6>

The hydraulic composition described in the above <4> or <5>, wherein the slag composition contains gypsum, in terms of gypsum dihydrate, in an amount of preferably 3% by mass or more, more preferably 5% by mass or more, and further preferably 8% by mass or more; and preferably 40% by mass or less, more preferably 20% by mass or less, and further preferably 13% by mass or less.

<7>

The hydraulic composition described in any one of the above <4> to <6>, wherein the slag composition contains calcium hydroxide in an amount of preferably 0% by mass or more, more preferably 0.1% by mass or more, and further preferably 0.3% by mass or more; and preferably 5% by mass or less, more preferably 2% by mass or less and further preferably 1% by mass or less.

<8>

The hydraulic composition described in any one of the above <4> to <7>, wherein a content of the slag composition in the hydraulic powder is preferably 65% by mass or more, more preferably 75% by mass or more, further preferably 90% by mass or more, further more preferably 93% by mass or more, further more preferably 95% by mass or more, and further more preferably substantially 100% by mass or 100% by mass.

<9>

The hydraulic composition described in any one of the above <1> to <8>, further containing alkanolamine.

<10>

The hydraulic composition described in the above <9>, wherein the alkanolamine is one or more kinds of alkanolamines selected from monoalkanolamines, dialkanolamines, and trialkanolamines.

<11>

The hydraulic composition described in the above <9> or <10>, wherein the alkanolamine is one or more kinds of alkanolamines selected from monoalkanolamines having one alkanol group with 1 or more and 5 or less carbon atoms, dialkanolamines having two alkanol groups with 1 or more and 5 or less carbon atoms, and trialkanolamines having three alkanol groups with 1 or more and 5 or less carbon atoms; preferably one or more kinds of alkanolamines selected from trialkanolamines; more preferably one or more kinds of alkanolamines selected from trialkanolamines having three alkanol groups with 1 or more and 4 or less carbon atoms; further preferably one or more kinds of alkanolamines selected from trialkanolamines having three alkanol groups with 2 or 3 carbon atoms; and further more preferably one or more kinds of alkanolamines selected from triethanolamine and triisopropanolamine.

<12>

The hydraulic composition described in any one of the above <9> to <11>, wherein the hydraulic composition contains alkanolamine in an amount of preferably 0.0005 parts by mass or more, more preferably 0.005 parts by mass or more, further preferably 0.010 parts by mass or more, further more preferably 0.050 parts by mass or more and further more preferably 0.070 parts by mass or more, relative to 100 parts by mass of the hydraulic powder; and preferably 1.000 part by mass or less, more preferably 0.500 parts by mass or less, further preferably 0.250 parts by mass or less, further more preferably 0.150 parts by mass or less, and further more preferably 0.120 parts by mass or less.

11

<13>
The hydraulic composition described in any one of the above <1> to <12>, further containing an aromatic compound having a hydroxyl group.
<14>
The hydraulic composition described in the above <13>, wherein the aromatic compound having the hydroxyl group is an aromatic compound having a hydroxyl group and a total carbon number of from 6 to 12; further an aromatic compound having from 1 to 5 hydroxyl groups and a total carbon number of from 6 to 12; further one or more kinds of aromatic compounds having a hydroxyl group selected from cyanocatechol and nitrocatechols; and further one or more kinds of aromatic compounds having a hydroxyl group selected from 4-cyanocatechols and 4-nitrocatechol.
<15>
The hydraulic composition described in the above <13> or <14>, wherein the hydraulic composition contains the aromatic compound having the hydroxyl group in an amount of preferably 0.0005 parts by mass or more, more preferably 0.001 parts by mass or more, further preferably 0.003 parts by mass or more, further more preferably 0.005 parts by mass or more and further more preferably 0.010 parts by mass or more relative to 100 parts by mass of the hydraulic powder; and preferably 1.000 part by mass or less, more preferably 0.500 parts by mass or less, further preferably 0.25 parts by mass or less and further more preferably 0.20 parts by mass or less.
<16>
The hydraulic composition described in any one of the above <1> to <15>, further containing an antifoaming agent.
<17>
The hydraulic composition described in the above <16>, wherein the antifoaming agent is an antifoaming agent selected from silicone-based antifoaming agents, fatty acid ester-based antifoaming agents and ether-based antifoaming agents.
<18>
The hydraulic composition described in the above <16> or <17>, wherein the silicone-based antifoaming agent is dimethylpolysiloxane.
<19>
The hydraulic composition described in any one of the above <16> to <18>, wherein the fatty acid ester-based antifoaming agent is polyalkylene glycol fatty acid ester.
<20>
The hydraulic composition described in any one of the above <16> to <19>, wherein the ether-based antifoaming agent is polyalkylene glycol ether.
<21>
The hydraulic composition described in any one of the above <1> to <20>, further containing an alkali metal hydroxide.
<22>
The hydraulic composition described in the above <21>, wherein the alkali metal hydroxide is a hydroxide having an alkali metal selected from lithium, sodium and potassium; further a hydroxide having an alkali metal selected from sodium and potassium; or a compound selected from lithium hydroxide, sodium hydroxide and potassium hydroxide; and further sodium hydroxide.
<23>
The hydraulic composition described in the above <21> or <22>, wherein the hydraulic composition contains the alkali metal hydroxide in an amount of preferably 0.0005 parts by mass or more, more preferably 0.001 parts by mass or more, further preferably 0.005 parts by mass or more,

12 relative to 100 parts by mass of the hydraulic powder; and preferably 1.0 part by mass or less, more preferably 0.50 parts by mass or less, further preferably 0.10 parts by mass or less and further more preferably 0.05 parts by mass or less.
<24>
The hydraulic composition described in any one of the above <1> to <23>, wherein the α-hydroxy sulfonic acid or a salt thereof is an α-hydroxy sulfonic acid or a salt thereof with 1 or more carbon atoms, and preferably 10 or less, more preferably 6 or less, further preferably 4 or less carbon atoms; and further one or more kinds of compounds selected from hydroxymethanesulfonate, 1,2-dihyroxypropane-2-sulfonic acid, and salts thereof.

EXAMPLES

The following Examples describe the implementation of the present invention. The Examples are for illustration of the present invention, and are not intended to limit the present invention.

Hydraulic compositions were prepared in accordance with Appendix 2 of Physical Testing Methods for Cement (JIS R 5201) (testing methods for cement—measurement of strength). Compressive strengths of obtained hydraulic compositions were evaluated in accordance with Appendix 2 of Physical Testing Methods for Cement (JIS R 5201) (testing methods for cement—measurement of strength).

Formulations of the hydraulic compositions are shown in Table 1. In the formulations of Table 1, 0.03 g of Foamlex 797 (manufactured by Nicca Chemical Co., Ltd.) was added as an antifoaming agent to each.

Further, as a portion of hydraulic powder, a slag composition having Formulation 1, 2 or 3 in Table 2 was used.

Compressive strengths after 3 days from the preparation of the hydraulic compositions were measured. In some testing examples, compressive strengths after 28 days from the preparation were also measured. Results are shown in Tables 3 to 6. In Tables 3 to 6, relative values of compressive strengths are a relative value when taking results of comparative examples having a branch number "-1" of each test number as 100.

In Tables 3 to 6, an α-hydroxy sulfonic acid or a salt thereof, alkanolamine, an aromatic compound having a hydroxyl group and NaOH are indicated as component (A), component (B), component (C), and component (D), respectively.

Further, abbreviations in Tables 3 to 6 have the following meanings.
DHPS: sodium 1,2-dihyroxypropane-2-sulfonic acid
HMS: sodium hydroxymethanesulfonate
TEA: triethanolamine
TiPA: triisopropanolamine

TABLE 1

| W/P | W | P | S |
|---|---|---|---|
| 0.50 | 225 g | 450 g | 1350 g |

Symbols in Table 1 have the following meanings.
W: water
P: hydraulic powder (slag composition in Table 2 or hydraulic powder in Tables 3 to 6)
S: fine aggregate (standard sand for cement strength test: manufactured by The Japan Cement Association)

TABLE 2

| | | | Slag *1 | Gypsum dihydrate | Calcium hydroxide |
|---|---|---|---|---|---|
| Hydraulic powder | Formulation 1 | Mass (g) | 380.25 | 67.5 | 2.25 |
| | | Ratio (% by mass) | 84.5 | 15 | 0.5 |
| | Formulation 2 | Mass (g) | 402.75 | 45 | 2.25 |
| | | Ratio (% by mass) | 89.5 | 10 | 0.5 |
| | Formulation 3 | Mass (g) | 292.5 | 150 | 7.5 |
| | | Ratio (% by mass) | 65.0 | 33.3 | 1.7 |

*1 Slag: Spirits S-40A (manufactured by Nippon Steel & Sumikin Cement Co., Ltd.)

TABLE 3

| | | | Hydraulic composition | | | | | | Compressive strength 3 days later | |
|---|---|---|---|---|---|---|---|---|---|---|
| | | | Hydraulic powder | | | (A) Component | | (B) Component | | |
| | | | Type | Ratio of slag (% by mass) | Ratio of cement (% by mass) | Type | Content (part by mass*) | Type | Content (part by mass*) | Measured value (N/mm²) | Relative value |
| Test No. | 1-1 | Comparative Examples | Ordinary cement*¹ | 0 | 100 | — | — | — | — | 26.95 | 100 |
| | 1-2 | | | | | HMS | 0.1 | — | — | 28.50 | 106 |
| | 1-3 | | | | | HMS | 0.1 | TEA | 0.1 | 28.30 | 105 |
| | 2-1 | Comparative Examples | Blast furnace cement Type B*² | 40-45 | 60-55 | — | — | — | — | 22.45 | 100 |
| | 2-2 | | | | | HMS | 0.1 | — | — | 22.05 | 98 |
| | 2-3 | | | | | HMS | 0.1 | TEA | 0.1 | 19.50 | 87 |
| | 3-1 | Comparative Example | Ordinary cement/ Formulation 2 = 30/70 (mass ratio) | 62.65 | 30 | — | — | — | — | 14.5 | 100 |
| | 3-2 | Examples | | | | HMS | 0.1 | — | — | 16.1 | 111 |
| | 3-3 | | | | | HMS | 0.1 | TEA | 0.1 | 15.2 | 105 |
| | 4-1 | Comparative Example | Formulation 3 | 65.0 | 0 | — | — | — | — | 1.65 | 100 |
| | 4-2 | Examples | | | | HMS | 0.1 | — | — | 2.84 | 172 |
| | 4-3 | | | | | HMS | 0.1 | TEA | 0.1 | 2.56 | 155 |
| | 5-1 | Comparative Example | Ordinary cement/ Formulation 2 = 20/80 (mass ratio) | 71.6 | 20 | — | — | — | — | 11.2 | 100 |
| | 5-2 | Examples | | | | HMS | 0.1 | — | — | 14.2 | 127 |
| | 5-3 | | | | | HMS | 0.1 | TEA | 0.1 | 12.05 | 108 |
| | 6-1 | Comparative Example | Formulation 1 | 84.5 | 0 | — | — | — | — | 4.89 | 100 |
| | 6-2 | Examples | | | | HMS | 0.1 | — | — | 8.95 | 183 |
| | 6-3 | | | | | HMS | 0.1 | TEA | 0.1 | 9.61 | 197 |
| | 7-1 | Comparative Examples | Formulation 2 | 89.5 | 0 | — | — | — | — | 6.37 | 100 |
| | 7-2 | Example | | | | HMS | 0.1 | — | — | 12.3 | 193 |
| | 7-3 | | | | | HMS | 0.1 | TEA | 0.1 | 15.2 | 239 |

*Part by mass: part by mass relative to 100 parts by mass of hydraulic powder (the same applies hereinafter)
*¹ordinary cement (manufactured by Taiheiyo Cement Corporation)
*²blast furnace cement Type B (manufactured by Sumitomo Osaka Cement Co., Ltd.)

From Table 3, Examples using hydraulic powder containing 60% by mass or more of slag show that inclusion of an α-hydroxy sulfonic acid or a salt thereof increases the 3-day compressive strength more than the absence thereof, and combined use of alkanolamine increases the compressive strength further more. Meanwhile, in Comparative Examples using blast furnace cement Type B containing 40 to 45% by mass of slag, even when an α-hydroxy sulfonic acid or a salt thereof is contained, the compressive strength is not increased; in the case of the ordinary cement not containing slag, even when an α-hydroxy sulfonic acid or a salt thereof is contained, an increase of compressive strength is about 6%.

TABLE 4

| | | | Hydraulic powder | | | (A) Component | | (B) Component | | (C) Component | |
|---|---|---|---|---|---|---|---|---|---|---|---|
| | | | Type | Ratio of slag (% by mass) | Ratio of cement (% by mass) | Type | Content (part by mass) | Type | Content (part by mass) | Type | Content (part by mass) |
| Test No. | 8-1*¹ | Comparative Examples | Formulation 2 | 89.5 | 0 | — | — | — | — | — | — |
| | 8-2 | | | | | — | — | TEA | 0.1 | — | — |
| | 8-3 | | | | | — | — | TiPA | 0.1 | — | — |
| | 8-4 | | | | | — | — | — | — | — | — |

TABLE 4-continued

| | | | | | | | | | |
|---|---|---|---|---|---|---|---|---|---|
| 8-5*¹ | Examples | | HMS | 0.1 | — | — | — | — |
| 8-6*¹ | | | HMS | 0.1 | TEA | 0.1 | — | — |
| 8-7 | | | HMS | 0.1 | TiPA | 0.1 | — | — |
| 8-8 | | | DHPS | 0.1 | — | — | — | — |
| 8-9 | | | DHPS | 0.1 | TEA | 0.1 | — | — |
| 8-10 | | | HMS | 0.1 | TiPA | 0.1 | 4-cyanocatechol | 0.1 |
| 8-11 | | | HMS | 0.1 | TiPA | 0.1 | 4-cyanocatechol | 0.1 |
| 8-12 | | | DHPS | 0.1 | TiPA | 0.1 | 4-cyanocatechol | 0.1 |
| 8-13 | | | DHPS | 0.1 | TiPA | 0.1 | 4-cyanocatechol | 0.1 |
| 8-14 | | | HMS | 0.1 | TEA | 0.1 | 4-cyanocatechol | 0.1 |
| 8-15 | | | DHPS | 0.1 | TEA | 0.1 | 4-cyanocatechol | 0.1 |

| | | | | | | Compressive strength | | | |
|---|---|---|---|---|---|---|---|---|---|
| | | | | (D) Component | | 3 days later | | 28 days later | |
| | | | | Type | Content (part by mass) | Measured value (N/mm²) | Relative value | Measured value (N/mm²) | Relative value |
| Test No. | 8-1*¹ | Comparative | | — | — | 6.37 | 100 | 10.2 | 100 |
| | 8-2 | Example | | — | — | 7.75 | 122 | 12.7 | 125 |
| | 8-3 | | | — | — | 6.65 | 104 | 10 | 98 |
| | 8-4 | | | NaOH | 0.01 | 6.21 | 98 | 9.82 | 96 |
| | 8-5*¹ | Examples | | — | — | 12.3 | 193 | 23.7 | 232 |
| | 8-6*¹ | | | — | — | 15.2 | 239 | 36.1 | 354 |
| | 8-7 | | | — | — | 13 | 204 | 26.9 | 264 |
| | 8-8 | | | — | — | 13 | 204 | 24.6 | 241 |
| | 8-9 | | | — | — | 15 | 236 | 36.1 | 354 |
| | 8-10 | | | — | — | 22 | 345 | 46.7 | 458 |
| | 8-11 | | | NaOH | 0.01 | 22.5 | 353 | 45.9 | 450 |
| | 8-12 | | | — | — | 20.3 | 319 | 42.7 | 419 |
| | 8-13 | | | NaOH | 0.01 | 18.15 | 285 | 43 | 422 |
| | 8-14 | | | — | — | 20.3 | 319 | 45.7 | 448 |
| | 8-15 | | | — | — | 20.1 | 316 | 46.6 | 457 |

*¹Test Nos. 8-1, 8-5 and 8-6 correspond to Test Nos. 7-1, 7-2 and 7-3, respectively, in Table 3.

From Table 4, when sodium hydroxymethanesulfonate or sodium 1,2-dihyroxypropane-2-sulfonate is used as an α-hydroxy sulfonic acid or a salt thereof, the 3-day compressive strength is increased. Further, when triethanolamine or triisopropanolamine is used in combination as an alkanolamine, the compressive strength is further increased.

Moreover, in addition to the α-hydroxy sulfonic acid or the salt thereof and the alkanolamine, combined use of an aromatic compound having a hydroxyl group and an alkali metal hydroxide increases the compressive strength further more.

TABLE 5

| | | | Hydraulic composition | | | | | | | | |
|---|---|---|---|---|---|---|---|---|---|---|---|
| | | | Hydraulic powder *1 (% by mass) | | | | (A) Component | | (B) Component | | (C) Component | |
| | | | Slag | Anhydrous gypsum | Gypsum dihydrate | Calcium hydroxide | Type | Content (part by mass) | Type | Content (part by mass) | Type | Content (part by mass) |
| Test No. | 9-1 | Comparative Example | 89.5 | 0.0 | 100 | 0.5 | — | — | — | — | — | — |
| | 9-2 | Example | | | | | HMS | 0.1 | TiPA | 0.1 | 4-cyanocatechol | 0.1 |
| | 10-1 | Comparative Example | 89.5 | 10.0 | 0.0 | 0.5 | — | — | — | — | — | — |
| | 10-2 | Example | | | | | HMS | 0.1 | TiPA | 0.1 | 4-cyanocatechol | 0.1 |
| | 11-1 | Comparative Example | 87.0 | 0.0 | 12.5 | 0.5 | — | — | — | — | — | — |
| | 11-2 | Example | 84.5 | 0.0 | 15.0 | 0.5 | HMS | 0.1 | TiPA | 0.1 | 4-cyanocatechol | 0.1 |

TABLE 5-continued

| | | | | | | | | |
|---|---|---|---|---|---|---|---|---|
| 12-1 | Comparative Example | | — | — | — | — | — | — |
| 12-2 | Example | | HMS | 0.1 | TiPA | 0.1 | 4-cyanocatechol | 0.1 |

| | | | Hydraulic composition | Compressive strength | | | |
|---|---|---|---|---|---|---|---|
| | | | (D) Component | | 3 days later | | 28 days later |
| | | | Type | Content (part by mass) | Measured value (N/mm²) | Relative value | Measured value (N/mm²) | Relative value |
| Test No. | 9-1 | Comparative Example | — | — | 6.37 | 100 | 10.2 | 100 |
| | 9-2 | Example | NaOH | 0.01 | 22.5 | 353 | 45.9 | 450 |
| | 10-1 | Comparative Example | — | — | 11.0 | 100 | 19.3 | 100 |
| | 10-2 | Example | NaOH | 0.01 | 19.6 | 175 | 45.6 | 233 |
| | 11-1 | Comparative Example | — | — | 5.81 | 100 | 8.80 | 100 |
| | 11-2 | Example | NaOH | 0.01 | 21.0 | 361 | 46.5 | 528 |
| | 12-1 | Comparative Example | — | — | 4.89 | 100 | 7.70 | 100 |
| | 12-2 | Example | NaOH | 0.01 | 20.9 | 427 | 48.7 | 633 |

*1 The hydraulic powder for Test Nos. 9-1 and 9-2 has Formulation 2 in Table 2, and the hydraulic powder for Test Nos. 12-1 and 12-2 has Formulation 1 in Table 2.

From Table 5, in addition to the α-hydroxy sulfonic acid or the salt thereof and the alkanolamine, combined use of an aromatic compound having a hydroxyl group and an alkali metal hydroxide further increases the compressive strength.

TABLE 6

| | | | Hydraulic composition | | | | | | | Compressive strength | |
|---|---|---|---|---|---|---|---|---|---|---|---|
| | | | Hydraulic powder | | | (A) Component | | (B) Component | | 3 days later | |
| | | | Type | Ratio of slag (% by mass) | Ratio of cement (% by mass) | Type | Content (part by mass) | Type | Content (part by mass) | Measured value (N/mm²) | Relative value |
| Test No. | 7-1 | Comparative Example | Formulation 2 | 89.5 | 0 | — | — | — | — | 6.37 | 100 |
| | 13-1 | Examples | | | | HMS | 0.01 | — | — | 7.5 | 118 |
| | 13-2 | | | | | HMS | 0.02 | — | — | 11.8 | 185 |
| | 13-3 | | | | | HMS | 0.05 | — | — | 12.7 | 199 |
| | 7-2 | | | | | HMS | 0.1 | — | — | 12.3 | 193 |
| | 13-4 | | | | | HMS | 0.2 | — | — | 11.1 | 174 |
| | 13-5 | | | | | HMS | 0.5 | — | — | 10.4 | 163 |
| | 13-6 | | | | | HMS | 1 | — | — | 9.45 | 148 |
| | 13-7 | | | | | HMS | 0.1 | TEA | 0.05 | 14.5 | 228 |
| | 7-3 | | | | | HMS | 0.1 | TEA | 0.1 | 15.2 | 239 |
| | 13-8 | | | | | HMS | 0.1 | TEA | 0.15 | 15.0 | 235 |
| | 13-9 | | | | | HMS | 0.05 | TEA | 0.05 | 14.1 | 221 |
| | 13-10 | | | | | HMS | 0.05 | TEA | 0.1 | 14.8 | 232 |
| | 13-11 | | | | | HMS | 0.05 | TEA | 0.15 | 14.4 | 226 |

From Table 6, even when the contents of the α-hydroxy sulfonic acid or the salt thereof and the alkanolamine are varied, the effect of increased compressive strength is observed.

The invention claimed is:

1. A hydraulic composition comprising an α-hydroxy sulfonic acid or a salt thereof, hydraulic powder and water, a ratio of slag in the hydraulic powder being 60% by mass or more.

2. The hydraulic composition according to claim 1, wherein the α-hydroxyl sulfonic acid or the salt thereof is contained in an amount of 0.0005 parts by mass or more and 1.000 part by mass or less relative to 100 parts by mass of the hydraulic powder.

3. The hydraulic composition according to claim 1, wherein a ratio of cement in the hydraulic powder is 35% by mass or less.

4. The hydraulic composition according to claim 1, further comprising alkanolamine.

5. The hydraulic composition according to claim 4, wherein alkanolamine is contained in an amount of 0.0005 parts by mass or more and 1.000 part by mass or less relative to 100 parts by mass of the hydraulic powder.

6. The hydraulic composition according to claim 1, further comprising an aromatic compound having a hydroxyl group.

7. The hydraulic composition according to claim 6, wherein the aromatic compound having the hydroxyl group is contained in an amount of 0.0005 parts by mass or more and 1.000 part by mass or less relative to 100 parts by mass of the hydraulic powder.

8. The hydraulic composition according to claim 1, wherein the α-hydroxy sulfonic acid or the salt thereof is one or more kinds of compounds selected from hydroxymethanesulfonate, 1,2-dihyroxypropane-2-sulfonic acid, and salts thereof.

9. A method of producing a hydraulic composition comprising adding an α-hydroxy sulfonic acid or a salt thereof to hydraulic powder and kneading with water, wherein a ratio of slag in the hydraulic powder is 60% by mass or more.

* * * * *